B. GOLD.
GATE CLOSING DEVICE.
APPLICATION FILED DEC. 13, 1913.
1,144,899.
Patented June 29, 1915.
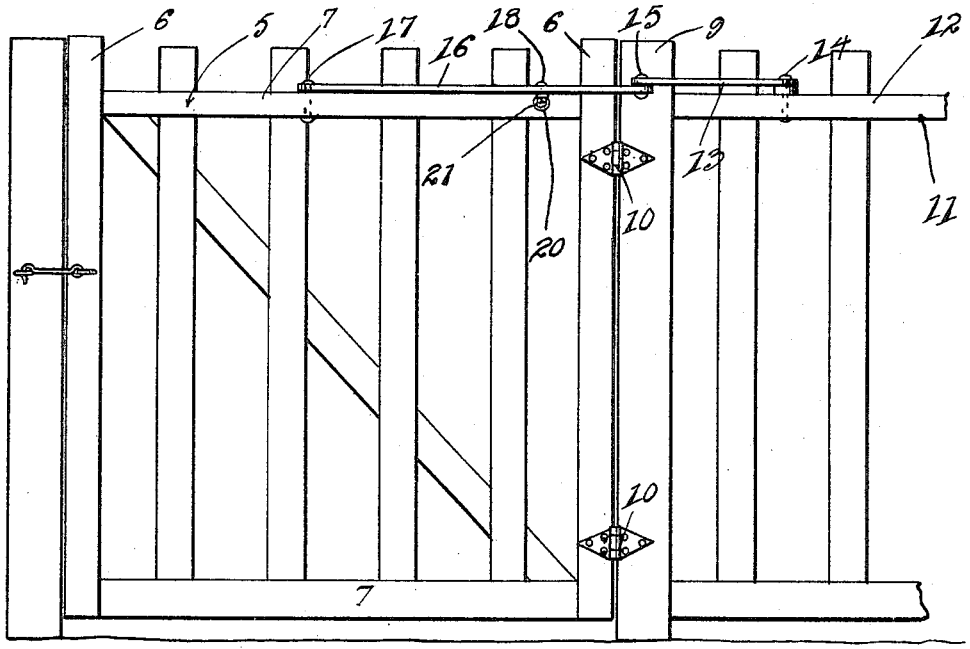
Fig. 1.
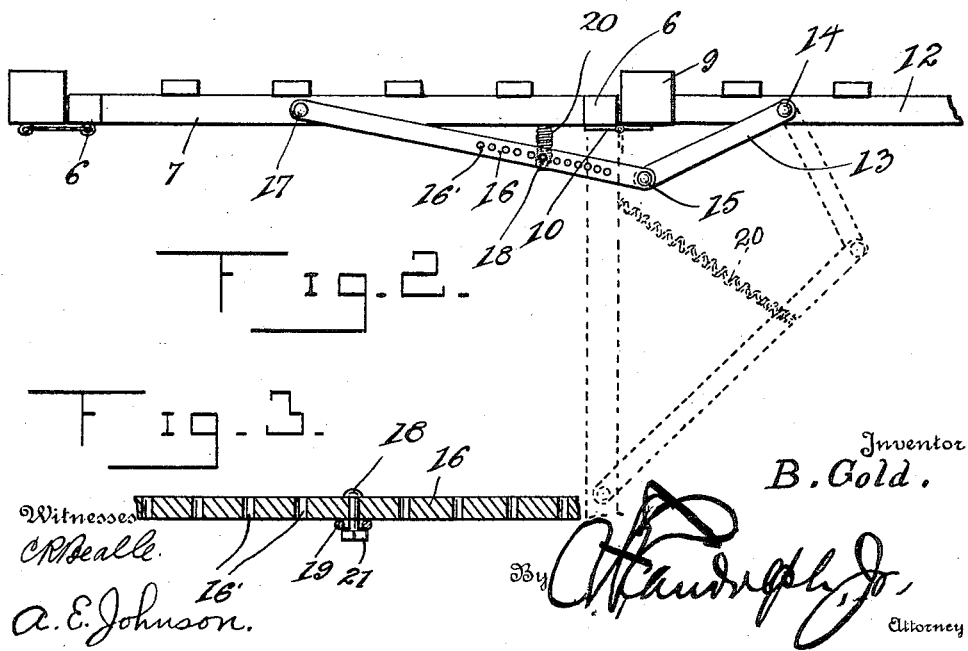
Fig. 2.
Fig. 3.
Witnesses
C. R. Bealle.
A. E. Johnson.
Inventor
B. Gold.
By
Attorney

UNITED STATES PATENT OFFICE.

BENJAMIN GOLD, OF INDIANA HARBOR, INDIANA.

GATE-CLOSING DEVICE.

1,144,899.  Specification of Letters Patent.  Patented June 29, 1915.

Application filed December 13, 1913. Serial No. 806,511.

*To all whom it may concern:*

Be it known that I, BENJAMIN GOLD, a citizen of the United States, residing at Indiana Harbor, in the county of Lake and State of Indiana, have invented certain new and useful Improvements in Gate-Closing Devices; and I do hereby declare the following to be a full, clear, and exact description of the invention, such as will enable others skilled in the art to which it appertains to make and use the same.

This invention relates to improvements in gate closing devices, and has for its primary object to provide a very simple and practical structure which will operate to close a gate, door, or other swinging object when the pressure which opens the same is removed.

With this and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which—

Figure 1 is a side elevation of a fence section and gate, showing my device in operative position. Fig. 2 is a top plan view, showing in solid lines the positions of the device when the gate is closed, and showing in dotted lines the position of the device when the gate is open, and Fig. 3 is a fragmentary sectional view through a portion of the device to be hereinafter described.

Referring in detail to the drawings by numerals, 5 designates generally, a gate including the uprights 6 and cross bars 7. The gate is connected to a gate post 9 by means of suitable hinges 10, said gate post forming a portion of a fence, generally designated 11, and including a horizontal bar 12.

In carrying out my invention, I provide a relatively short lever 13 which is pivotally connected at one end by means of the vertical fastener 14 to the top of the bar 12 and which is pivotally connected at its other end by means of the pin 15 to a relatively long lever 16. This second mentioned lever is connected at its other end by means of the vertical fastener 17 to the top of the cross bar 7 of the gate. A contractile spiral spring 20 is connected at one end to the lever 16 and at its other end to the cross bar 7. The lever is formed with a longitudinal series of alined openings 16' through any one of which a bolt 18 may be inserted. This bolt passes through an eye 19 formed on the end of the spring 20 to connect the spring to the lever. A nut 21 is threaded upon the bolt into engagement with the eye so as to hold the spring attached to the bolt. This manner of connecting the spring and lever permits the tension of the former to be adjusted.

When the gate is opened, the angle formed by the levers 13 and 16 diminishes in size and the angles which the levers form with the fence and gate respectively increase in size, as shown by the dotted line in Fig. 2. The spring 20 is stretched and tends to draw the lever 16 toward the gate. When the pressure which opened the gate is removed, the action of the spring will cause the lever 16 to be drawn toward the gate and the lever will coöperate with the lever 13 and swing the gate into its closed position.

From the foregoing description taken in connection with the accompanying drawings, it will be evident that I have provided a very simple, practical, and efficient gate closing device, which will always return a gate to its closed position when the pressure is removed therefrom. It will be understood that the levers and spring may be connected to different portions of the gate and fence from those shown in the drawings and that various changes in proportion and arrangement of parts may be made without departing from the scope and spirit of the invention as claimed.

Having thus described my invention, I claim:—

The combination with a fence and a gate, of a pair of levers, one of said levers being shorter than the other, and said levers being pivotally connected together at one of the ends, the free end of said short lever being pivotally connected to the fence, the longer lever having a plurality of apertures therein adjacent its pivotal end, and its other end being pivotally secured to the gate, a spring adjustably connected at one of its ends to the longer lever and the other end of said spring being connected to the gate between the pivotal point of the longer lever and one end of the gate, said spring adapted to close the gate.

In testimony whereof I affix my signature in presence of two witnesses.

BENJAMIN GOLD.

Witnesses:
ROBERT MOORE BLACK,
JOHN P. BRISSEY.

Copies of this patent may be obtained for five cents each, by addressing the "Commissioner of Patents, Washington, D. C."